June 9, 1931. J. H. CRAGG ET AL 1,809,110
CONVERTER FOR ELECTRIC CURRENT
Filed Aug. 14, 1929 2 Sheets-Sheet 1
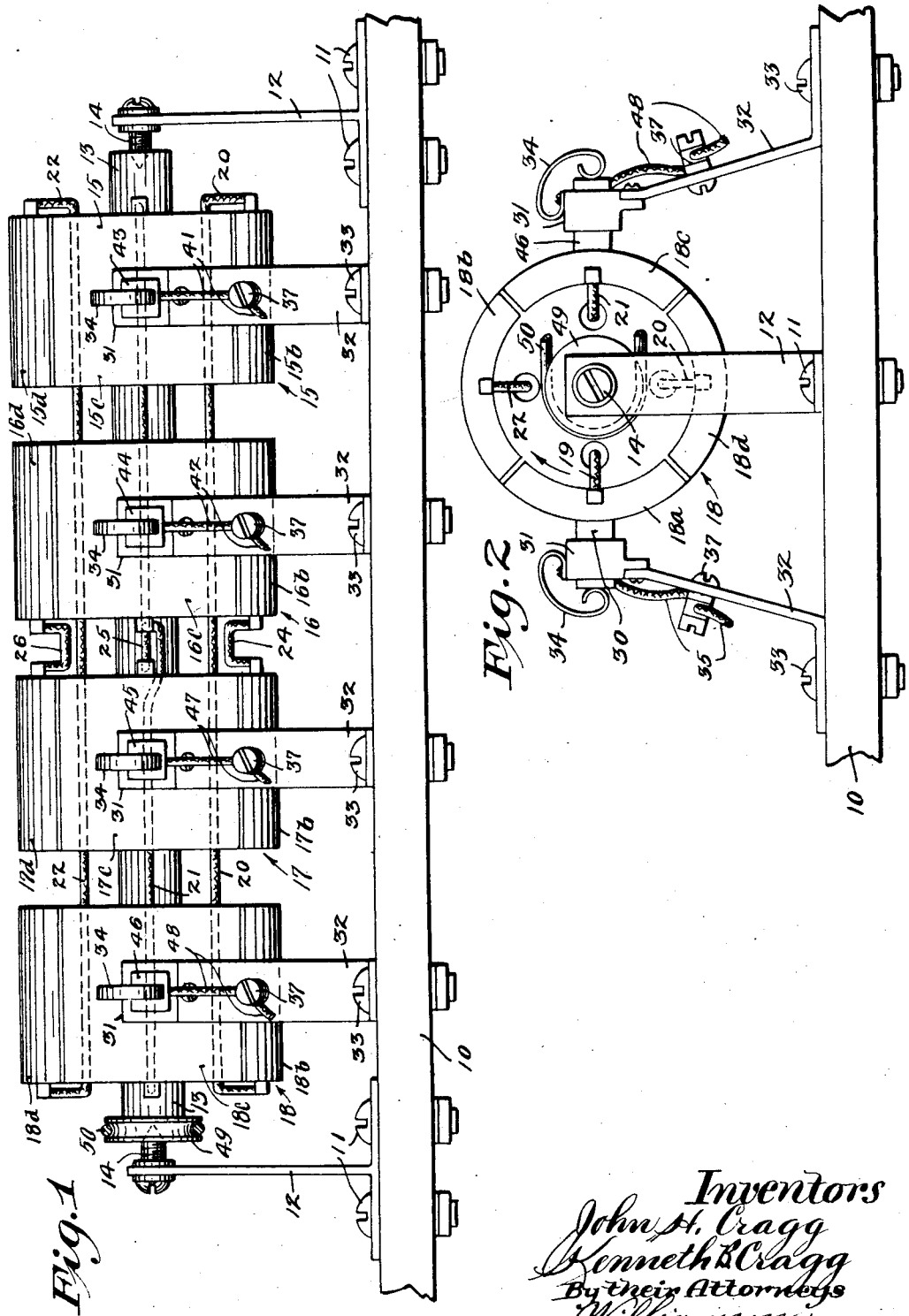
Inventors
John H. Cragg
Kenneth B. Cragg
By their Attorneys
Williamson
Reif & Williamson June 9, 1931.  J. H. CRAGG ET AL  1,809,110
CONVERTER FOR ELECTRIC CURRENT
Filed Aug. 14, 1929    2 Sheets-Sheet 2
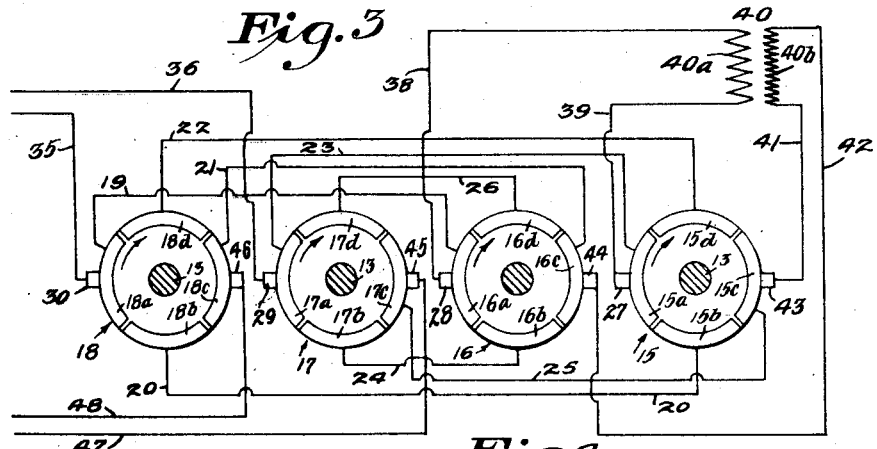
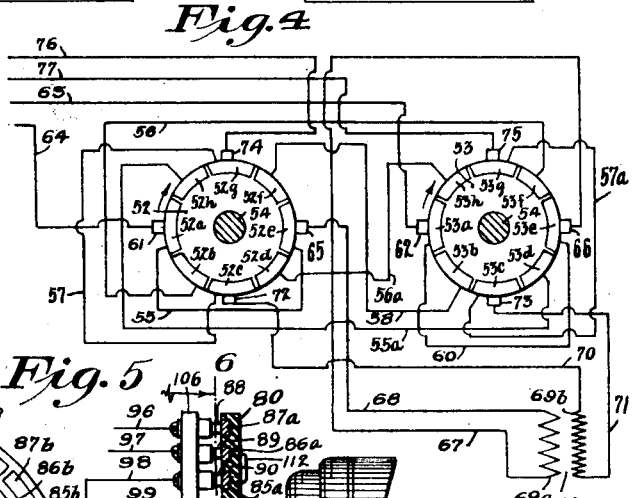
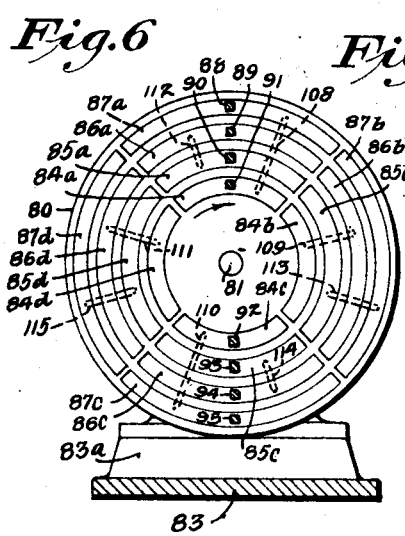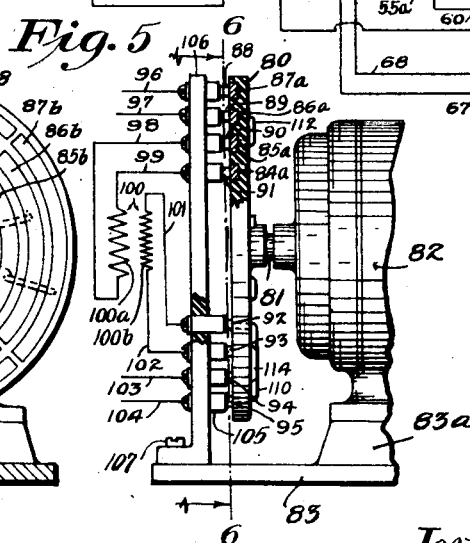
Inventors
John H. Cragg
Kenneth B. Cragg
By their Attorneys Patented June 9, 1931

1,809,110

UNITED STATES PATENT OFFICE

JOHN H. CRAGG AND KENNETH B. CRAGG, OF HOPKINS, MINNESOTA

CONVERTER FOR ELECTRIC CURRENTS

Application filed August 14, 1929. Serial No. 385,836.

This invention relates to an apparatus for converting electrical current. At present, in various arts, it is often desired to have both direct and alternating current available and it is often desirable to have these currents available at high and low voltages. It is desirable, therefore, to have a simple and easily operated apparatus which will convert direct current to alternating current and vice versa and by means of which direct current of low voltage can be quickly converted to direct current of high voltage.

It is an object of this invention, therefore, to provide a simple and efficient converting apparatus for converting direct current to alternating current or direct current of low voltage to direct current of high voltage, which comprises a plurality of groups of commutator bars carried on a rotating element, together with a plurality of sets of brushes cooperating with said bars.

It is a further object of the invention to provide an electrical conversion apparatus comprising one or more rotating members having groups of commutator bars with a plurality of sets of brushes, each set having four brushes therein arranged to respectively engage the groups of bars, a pair of conductors connected to one pair of brushes of one set adapted to receive low voltage direct current, a pair of conductors connected to the other pair of brushes of said set adapted to receive alternating current of low voltage, a pair of conductors connected to a pair of the brushes of the other set adapted to receive high voltage alternating current and a pair of conductors connected to the other pair of brushes of said other set adapted to receive high voltage direct current, a means for stepping up the voltage of the current, being connected to said second and third mentioned pairs of conductors.

These and other objects and advantages of the invention will be fully set forth in the following description made in connection with the accompanying drawings, in which like reference characters refer to similar parts throughout the several views, and in which:—

Fig. 1 is a view in side elevation of one form of the apparatus;

Fig. 2 is a view in end elevation of the apparatus shown in Fig. 1;

Fig. 3 is a diagrammatic representation of the apparatus shown in Figs. 1 and 2;

Fig. 4 is a diagrammatic representation of a modification of the form of the apparatus;

Fig. 5 is a view in side elevation of a further modification, some parts being broken away and other shown in vertical section, and Fig. 6 is a vertical section taken on line 6—6 of Fig. 5 as indicated by the arrow.

Referring to the drawing, particularly Figs. 1 to 3, a conversion apparatus is shown comprising a base plate or member 10 having secured thereto as by the headed and nutted bolts 11, bearing standards 12. The standards 12 carry bearing means for a rotating shaft 13 and while various types of bearings may be used, in the embodiment of the invention illustrated, the standards 12 are shown as having secured therein screws 14 having pointed conical ends received in conical recesses in the ends of shaft 13. Shaft 13 has secured thereto a plurality of cylinders which in the embodiment of the invention illustrated are shown as four in number and numbered 15, 16, 17 and 18 respectively. Cylinders 15 to 18 are made of some rigid insulating material and each has inserted in its periphery a plurality of commutator bars. In the embodiment of the invention illustrated in Figs. 1 to 3 there are four of these bars for each cylinder. The bars of cylinder 15 are designated 15a, 15b, 15c and 15d, and the respective bars of each cylinder are designated by similar letter suffixes. The bars are separated from each other by the insulating material of the cylinder. The cylinders 15, 16, 17 and 18, being secured to shaft 13, are rotated as a unit with said shaft. The commutator bars of said cylinders are connected in certain ways as follows:

A conductor 19 connects bar 18a to bar 16a, a conductor 20 connects bar 18b to bar 15b, a conductor 21 connects bar 18c to bar 16c, a conductor 22 connects bar 18d to bar 15d, a conductor 23 connects bar 17a to bar 15a, a conductor 24 connects bar 17b to bar 16b, a conductor 25 connects bar 17c to bar 15c, and a conductor 26 connects bar 17d to bar 16d.

A plurality of sets of brushes are used, one set comprising brushes 27, 28, 29 and 30. Said brushes engage respectively with cylinders 15, 16, 17 and 18 at one side thereof. The brushes are carried in apertured brush holders 31 secured to the top of brackets 32 having flanges secured to the base member 10 by the headed and nutted bolts 33. Said brushes are urged toward the cylinders by springs 34 secured to the top of brush holders 31 and are bent downwardly and inwardly to bear against the ends of said brushes. Conductors 35 and 36 are connected to brushes 30 and 29 respectively, said conductors being held in position on brackets 32 by screw clamps 37. Conductors 38 and 39 are connected respectively to the brushes 28 and 27.

In the embodiment of the invention shown in Fig. 3, conductors 38 and 39 are connected to the primary winding 40a of a transformer 40, the secondary or high winding of which is shown as 40b. Conductors 41 and 42 lead from the terminals of said secondary winding 40b. There is another set of brushes used on the device which are located at the side opposite the brushes 27 to 30 inclusive. These brushes 43, 44, 45 and 46 engage the cylinders 15, 16, 17 and 18 respectively and are located at the side opposite brushes 27, 28, 29 and 30 respectively. Brushes 43 to 46 inclusive are also carried in brush holders 31 secured to the top of brackets 32 and pressed inwardly by springs 34. Said brackets 32 are secured to the base 10 by the headed and nutted bolts 33. Brackets 32 at either side of the machine are reversely disposed. Conductors 42 and 42 are connected respectively to brushes 43 and 44. Another pair of conductors 47 and 48 are connected respectively to brushes 45 and 46. The shaft 13 has secured to one end a pulley 49 adapted to be driven from some suitable source of power by a belt 50.

In operation of the device shown in Figs. 1, 2 and 3, direct current such as current from a battery will be delivered to conductors 35 and 36. The cylinders 15 to 18 inclusive will be rotated through belt 50, pulley 49 and shaft 13. Direct current supplied to conductors 35 and 36 will be converted to alternating current which will be taken off through conductors 38 and 39. This conversion takes place as follows:

Assuming that conductor 35 carries a positive current or is of positive polarity, commutator bar 18a will be of this polarity and on account of conductor 19, commutator bar 16a will be of this polarity. Brush 28 is in contact with commutator bar 16a so that conductor 38 will thus also have positive current or polarity delivered thereto, while the commutator bars are in the position shown in Fig. 3. Negative current or current of negative polarity will be delivered by conductor 36 to brush 29 and commutator bar 17a. This bar is connected by conductor 23 to bar 15a with which brush 27 is in contact so that conductor 39 connected to brush 27 will receive current of negative polarity. As the cylinders now revolve in the direction of the arrows shown in Fig. 3, commutator bar 18b will next come under brush 30. Current of positive polarity will then be delivered to bar 18b and owing to conductor 20, such current will be delivered to commutator bar 15b. This will now be in contact with brush 27 so that current of positive polarity will be delivered to conductor 39. Current of negative polarity from conductor 36 will be delivered through brush 29 to bar 17b and through conductor 24 to bar 16b. This will now be in contact with brush 28 so that current of negative polarity will be delivered to conductor 38. It is thus seen that when bars 18b and 17b come under brushes 30 and 29 that the current in conductors 38 and 39 is reversed in polarity. Bar 18c will next come under brush 30 and current of positive polarity will be delivered from conductor 35 to bar 18c and through conductor 21 to bar 16c. Bar 16c will be in contact with brush 28 so that current of positive polarity will be delivered to conductor 38. Bar 17c will be under brush 29 and receive current of negative polarity which owing to conductor 25 will be transmitted to bar 15c which will now be under brush 27 so that current of negative polarity is delivered to conductor 39. Bar 18d will next come under brush 30 and current of positive polarity will be delivered to said bar and through conductor 22 to bar 15d. Bar 15d will be under brush 27 and current of positive polarity will be delivered to conductor 39. Current of negative polarity will be delivered to bar 17d through brush 29 which through conductor 26 will be transmitted to bar 16d. This bar will be under brush 28 so that current of negative polarity will be delivered to conductor 38. It will thus be seen that direct current supplied to conductors 35 and 36 is converted to alternating current in conductors 38 and 39, the polarity of the current in the latter conductors changing as each new pair of bars come under the brushes. The alternating current thus delivered to primary winding 40a will be transformed to high voltage alternating current in the secondary winding 40b and delivered to conductors 41 and 42. Assuming that current of positive polarity is flowing in conductor 41 when the apparatus is in the position shown in Fig. 3, such current will through brush 43 be delivered to bar 15c and through conductor bar 25 to bar 17c. This will be in engagement with brush 45 so that current of positive polarity will be delivered to conductor 47. At the same time current of negative polarity will be flowing in conductor 42 and will be delivered through brush 44 to bar 16c and through conductor 21 to bar 18c. Bar 18c is in contact with brush 46 so that current of negative polarity will be delivered to conductor 48. In the rotation of the device, bar 15d will next come under brush 43 and at this time current of negative polarity will be flowing in conductor 41 which will be delivered to bar 15d and through conductor 22 to bar 18d. Bar 18d will now be in contact with brush 46 so that current of negative polarity will be delivered to conductor 48. At the same time current of positive polarity will be flowing in conductor 42 and will be delivered through brush 44 to bar 16d. This will be delivered through conductor 26 to bar 17d which will then be in contact with brush 45 so that current of positive polarity will be delivered to conductor 47. Bar 15a will next come under brush 43 and at this time current of positive polarity is flowing in conductor 41 and will be delivered to bar 15a and through conductor 23 to bar 17a. Bar 17a will at this time be in engagement with brush 45 so that current of positive polarity will be delivered to conductor 47. At the same time current of negative polarity will be flowing in conductor 42 which will be delivered to bar 16a and through conductor 19 to bar 18a. Bar 18a will be in contact with brush 46 so that current of negative polarity will be delivered to conductor 48. Bar 15b will next come under brush 43 and at this time current of negative polarity is flowing in conductor 41 and will be delivered through brush 43 to bar 15b and through conductor 20 to bar 18b. Bar 18b will at this time be under brush 46 so that current of negative polarity will be delivered to conductor 48. At the same time current of positive polarity will be flowing in conductor 42 and will be delivered through brush 44 to bar 16b. This will be transmitted through conductor 24 to bar 17b which will be under brush 45 so that current of positive polarity is delivered to conductor 47. It will thus be seen that the alternating current in conductors 41 and 42 will be rectified and delivered to conductors 47 and 48 as direct current. It will also be seen that the low voltage direct current delivered to conductors 35 and 36 has now been changed to high voltage direct current in conductors 47 and 48.

In Fig. 4 a modified form of the invention is shown in which only two cylinders 52 and 53 are used which will be secured on a common shaft 54 similar to the shaft 13. Cylinder 52 is provided with eight commutator bars or segments separated by the insulating material of said cylinder, which bars are designated 52a, 52b, 52c, 52d, 52e and 52f, 52g and 52h. Cylinder 53 is likewise provided with eight commutator bars spaced and insulated, and designated 53a, 53b, 53c, 53d, 53e, 53f, 53g and 53h. The bars of cylinders 52 and 53 are connected as follows:

Bar 52a is connected by conductor 55 to bar 52d, bar 52d is connected by conductor 56 to bar 53f, bar 52c is connected by conductor 57 to bar 52g, bar 52d is connected by conductor 56a to bar 53h, bar 52f is connected by conductor 58 to bar 53b, bar 53a is connected by conductor 60 to bar 53e. Bar 52h is connected by conductor 55a to bar 53d and bar 53g is connected by conductor 57a to bar 53c. A pair of brushes 61 and 62 are provided at the same side of cylinders 52 and 53, which will be of the construction shown in Figs. 1 and 2. A pair of conductors 63 and 64 are connected respectively to the brushes 62 and 61. Another pair of brushes 65 and 66 are provided which will be disposed at the sides of cylinders 52 and 53 opposite to brushes 61 and 62, and conductors 68 and 67 are connected respectively to brushes 66 and 65, the other ends of which are connected to the ends of the primary or low winding 69a of the transformer 69, the secondary or high winding of which is shown as 69b. Another pair of brushes 74 and 75 are provided which will be disposed substantially 90 degrees from brushes 61 and 62. Brushes 74 and 75 have connected thereto conductors 76 and 77 respectively. A pair of conductors 70 and 71 lead from the ends of the winding 69b and are connected respectively to brushes 72 and 73 disposed in engagement with cylinders 52 and 53 at the sides thereof substantially opposite brushes 74 and 75.

In the operation of the device shown in Fig. 4, low voltage direct current will be supplied to conductors 63 and 64 and will thus be supplied to brushes 61 and 62. When the parts are in the position shown in Fig. 4, assuming current of positive polarity is supplied to conductor 63, it will be transmitted through brush 62 to bar 53a and through conductor 60 to brush 66. Current of positive polarity will therefore be taken off by conductor 67 and transmitted to the winding 69a. Current of negative polarity will at the same time be furnished to conductor 64 and thus to brush 61 and to bar 52a. This bar is connected by conductor 55 to bar 52e so that current of negative polarity will then be delivered to brush 65 and to conductor 68 which is connected to winding 69b. When the cylinders 52 and 53 revolve in the direction indicated by the arrows, bar 53b will next come under brush 62 and current of positive polarity will be delivered to this bar, which will be transmitted by conductor 58 to bar 52f. Bar 52f will at this time be under brush 65 so that current of positive polarity will now be delivered to conductor 68 and to winding 69a. Current of negative polarity will be delivered through conductor 64 to bar 52b, which will be in engagement with said brush and this will be transmitted through conductor 56 to bar 53f, which will now be in engagement with brush 66 so that current of negative polarity will be delivered to conductor 67. When the cylinders revolve to the next bar, bar 53c will be in engagement with brush 62 so that current of positive polarity will be delivered thereto and through conductor 57a to bar 53g. Bar 53g will at this time be in engagement with brush 66 so that current of positive polarity will now be delivered to conductor 67. At the same time current of negative polarity will be delivered by conductor 64 to brush 61 and bar 52c and this will be delivered to conductor 57 to bar 52g. Bar 52g will at this time be in engagement with brush 65 and current of negative polarity will thus be delivered to conductor 68. When the cylinders revolve to the next bar, current of positive polarity will be delivered to brush 62 and to bar 53d. This will be delivered by conductor 55a to bar 52h, which bar will at this time be under brush 65 so that current of positive polarity is now delivered to conductor 68. At the same time current of negative polarity will be delivered to bar 52d and this will be transmitted through conductor 56a to bar 53h which will at this time be under brush 66 so that current of negative polarity is now delivered to conductor 67. If the cylinders continue to revolve, bar 53e will next come under brush 62 and current of positive polarity will be delivered thereto and through conductor 60 to bar 53a. This bar will then be in engagement with brush 66 so that current of positive polarity will be delivered to brush 66 and to conductor 67. At the same time current of negative polarity will be delivered through conductor 64 and brush 61 to bar 52e and through conductor 55 to bar 52a. Bar 52a will at this time be in engagement with brush 65 so that current of negative polarity is delivered to conductor 68. Bar 53f will next come under brush 62 and current of positive polarity will be delivered thereto and through the conductor 56 to bar 52b, which will at this time be under brush 65 so that current of positive polarity will now be delivered to conductor 68. At the same time current of negative polarity will be delivered through conductor 64 and brush 61 to bar 52f and through conductor 58 to bar 53b. Bar 53b will at this time be under brush 66 so that current of negative polarity will be delivered to conductor 67. Bar 53g will next come under brush 62 so that current of positive polarity will be delivered thereto and through conductor 57a to bar 53c. Bar 53c will at this time be under brush 66 so that current of positive polarity will be delivered thereto and to conductor 67. At the same time current of negative polarity will be delivered through conductor 64 and brush 61 to bar 52g and through conductor 57 to bar 52c. Bar 52c will at this time be under brush 65 so that current of negative polarity will now be delivered to conductor 68. As the cylinders revolve, bar 53h will next come under brush 62 and current of positive polarity will be delivered thereto and through conductor 56a to bar 52d. Bar 52d will at this time be under brush 65 so that current of positive polarity will now be delivered to conductor 68. At the same time current of negative polarity will be delivered through conductor 64 and brush 61 to bar 52h and through conductor 55a to bar 53d. Bar 53d will at this time be in engagement with brush 66 so that current of negative polarity is now delivered to conductor 67. It is thus seen that as the cylinders 52 and 53 revolve, the direct current supplied to conductors 63 and 64 is changed to alternating current in conductors 67 and 68. The alternating current in conductors 67 and 68 is delivered to winding 69a and will be stepped-up in voltage in winding 69b and delivered to conductors 70 and 71. Assuming that positive current is flowing in conductor 70, with the parts in the position shown in Fig. 4, the same will be delivered to brush 72 and bar 52c and through conductor 57 to bar 52g. Bar 52g is at this time in engagement with brush 74 so that current of positive polarity will be delivered to conductor 76. At the same time current of negative polarity will be flowing in conductor 71 and this will be delivered to brush 73 and to bar 53c. The same will be transmitted through conductor 57a to bar 53g, which is then in engagement with brush 75 so that current of negative polarity will be delivered to conductor 77. When the cylinders are moved the distance of one bar, current of negative polarity will be flowing in conductor 70 and this will be transmitted through brush 72 to bar 52d and through conductor 56a to bar 53h. Bar 53h will at this time be in engagement with brush 75 so that current of negative polarity will then be delivered to conductor 77. At the same time current of positive polarity will be flowing in conductor 71 and will be delivered through brush 73 to bar 53d and through conductor 55a to bar 52h. Bar 52h will at this time be in engagement with brush 74 so that current of positive polarity will be delivered to conductor 76. When the cylinders move a distance of another bar, current of positive polarity will be flowing in conductor 70 and will be delivered through brush 72 to bar 52e and through conductor 55 to bar 52a. Bar 52a will be in engagement with brush 74 so that current of positive polarity is delivered to conductor 76. At the same time current of negative polarity will be flowing in conductor 71 and be delivered thorugh brush 73 to bar 53e and through conductor 60 to bar 53a. Bar 53a will at this time be in engagement with brush 75 so that current of negative polarity will be delivered to conductor 77. When the cylinders are moved a distance of one more bar, current of negative polarity will be flowing in conductor 70 and brush 89 and bar 86a and will be transmitted by conductor 112 to bar 85a. The latter bar is in contact with brush 90 so that negative current will be delivered to conductor 98. As disk 80 moves in the direction of the arrow, bar 87d will come under brush 88 and current of positive polarity will be delivered to said bar and through conductor 115 to bar 85d. Bar 85d will be in engagement with brush 90 so that current of positive polarity will be delivered to conductor 98. At the same time current of negative polarity will be delivered to brush 89 and to bar 86d and will be transmitted by conductor 111 to bar 84d. Bar 84d will be under brush 91 so that current of negative polarity is delivered to conductor 99. When the disk revolves to bring the next bars under the brushes 88 and 89, current of positive polarity will be delivered to bar 87c and will be transmitted by conductor 110 to bar 84c. Bar 84c will be at this time under brush 91 so that current of positive polarity is now delivered to conductor 99. At the same time current of negative polarity will be delivered by brush 89 to bar 86c and this will be transmitted by conductor 114 to bar 85c. Bar 85c will at this time be under brush 90 so that current of negative polarity is delivered to conductor 98. When the disk revolves further, bar 87b will be brought under brush 88 and will receive current of positive polarity which will be transmitted by conductor 113 to bar 85c which will be under brush 90 so that current of positive polarity is delivered to conductor 98. At the same time current of negative polarity will be delivered by brush 89 to bar 86b and this will be transmitted by conductor 109 to bar 84b. Bar 84b will at this time be under brush 91 and current of negative polarity will be delivered to conductor 99. It is thus seen that a direct current delivered in conductors 96 and 97 is converted to alternating current in conductors 98 and 99. This current will be stepped up in voltage by transformer 100 and this high voltage alternating current delivered to conductors 101 and 102. Assuming that current of positive polarity is being delivered by conductor 101, this will be transmitted by brush 92 to bar 84c and through conductor 110 to bar 87c. Bar 87c will be engaged by brush 95 so that current of positive polarity is delivered to conductor 104. At the same time current of negative polarity will be delivered by conductor 102 to brush 93 and thence to bar 85c and through conductor 114 to bar 86c. Bar 86c will be in engagement with brush 94 so that current of negative polarity is delivered to conductor 103. As the disk revolves, current of negative polarity will next be flowing in conductor 101 and will be delivered through brush 92 to bar 84b. This will be delivered by conductor 109 to bar 86b. Bar 86b will now be under brush 94 so that current of negative polarity is delivered to conductor 103. At the same time current of positive polarity will be flowing in conductor 102 and will be delivered through brush 93 to bar 85b and will be transmitted by conductor 113 to bar 87b. Bar 87b will at this time be in engagement with brush 95 so that current of positive polarity will be delivered to conductor 104. When disk 80 revolves a distance of another bar or segment, current of positive polarity will again flow in conductor 101 and will be delivered by brush 92 to bar 84a and through conductor 108 to bar 87a. Bar 87a will at this time be under brush 95 so that current of positive polarity will be delivered to conductor 104. At the same time current of negative polarity is flowing in conductor 102 and will be delivered by brush 93 to bar 85a and through conductor 112 to bar 86a. Bar 86a will at this time be in engagement with brush 94 so that current of negative polarity will be delivered to conductor 103. When the disk 80 revolves the distance of another bar or segment, current of negative polarity will again flow in conductor 101 and will be delivered by brush 92 to segment 84d and through conductor 111 to segment 86d. Segment 86d will at this time be under brush 94 so that current of negative polarity will again be delivered to conductor 103. At the same time current of positive polarity will be flowing in conductor 102 and this will be transmitted by brush 93 to bar 87b and through conductor 115 to bar 87d. Bar 87d will at this time be under brush 95 so that a current of positive polarity is again delivered to conductor 104.

From this description it is seen that the alternating current from the secondary winding 100b is rectified and direct current is delivered to conductors 103 and 104. The low voltage direct current therefore delivered to conductors 96 and 97 is changed to high voltage direct current in conductors 103 and 104. The frequency of the alternating current will be twice the revolutions per second of the form shown in Figs. 1 to 3 and Figs. 5 and 6. The frequency of the alternating current in the form shown in Fig. 4 will be four times the revolutions per second of cylinders 52 and 53. In other words, the frequency of the alternating current will be the number of revolutions per second multiplied by the number of pairs of commutator bars on the rotating element.

From the above description it is seen that applicant has provided a very simple, compact and efficient apparatus for changing a current of low voltage to a direct current of high voltage. The device comprises few parts and the same is easily made and operated. The same has been demonstrated in actual practice and found to be very successful and efficient.

It will, of course, be understood that variwill be delivered through brush 72 to bar 52*f* and through conductor 58 to bar 53*b*. Bar 53*b* will at this time be in engagement with brush 75 so that current of negative polarity will be delivered to conductor 77. At the same time current of positive polarity will be flowing in conductor 71 and will be delivered through brush 73 to bar 53*f* and through conductor 56 to bar 52*b*. Bar 52*b* will at this time be in engagement with brush 74 so that current of positive polarity will be delivered to conductor 76. At the same time current of negative polarity will be flowing in conductor 71 and will be delivered through brush 73 to bar 53*g* and through conductor 57*a* to bar 53*c*. Bar 53*c* will at this time be in engagement with brush 75 so that current of negative polarity will be delivered to conductor 77. When the cylinders 52 and 53 move through a distance to bring the next bar under brushes 72 and 73, current of negative polarity will be flowing in conductor 70 and this will be delivered through brush 72 to bar 52*h* and through conductor 55*a* to bar 53*d*. Bar 53*d* will at this time be under brush 75 so that current of negative polarity will be delivered to conductor 77. At the same time current of positive polarity will be flowing in conductor 71 and will be delivered through brush 73 to bar 53*f* and through conductor 56*a* to bar 52*d*. Bar 52*d* will at this time be under brush 74 so that current of positive polarity will be delivered to conductor 76. When cylinders 52 and 53 have revolved the distance of another bar, current of positive polarity will be flowing in conductor 70 and this will be delivered through brush 72 to bar 52*a* and through conductor 55 to bar 52*e*. Bar 52*e* will at this time be under brush 74 so that current of positive polarity will be delivered to conductor 76. At the same time current of negative polarity will be flowing in conductor 71 and will be delivered through brush 73 to bar 53*e* and through conductor 60 to bar 53*a*. Bar 53*a* will be under brush 75 and current of negative polarity will be delivered to conductor 77. When the cylinders 52 and 53 revolve to the next brush, current of negative polarity will be flowing in conductor 70 and this will be delivered through brush 72 to bar 52*b* and through conductor 56 to bar 53*f*. Bar 53*f* will be under brush 75 and current of negative polarity will be delivered to conductor 72. At the same time current of positive polarity will be flowing in conductor 71 and this will be delivered through brush 73 to bar 53*b* and through conductor 58 to bar 52*f*. Bar 52*f* will at this time be under brush 74 so that current of positive polarity is delivered to conductor 76.

It is thus seen that the direct current delivered to conductors 63 and 64 which is of low voltage has been converted to direct current of high voltage, which is delivered to conductors 76 and 77. Direct current of high voltage can thus be taken off directly from the same cylinders 52 and 53 to which the direct current of low voltage was delivered. The frequency will of course be determined by the speed of revolution of the cylinders 52 and 53.

In the modification shown in Figs. 5 and 6 a disk 80 is used which will be made of insulating material, the same being shown as having a hub and being secured to the armature shaft 81 of a motor 82 mounted upon a suitable pedestal 83*a* of a base member 83. The disk 80 has set into its face remote from motor 82 four groups of commutator bars or segments, the groups being in concentric and spaced relation. The bars of each group are spaced and insulated from each other. The bars of the inner group are designated 84*a*, 84*b*, 84*c* and 84*d*, the bars of the second group are designated 85*a*, 85*b*, 85*c*, and 85*d*, the bars of the third group are designated 86*a*, 86*b*, 86*c* and 86*d* and the bars of the fourth group are designated 87*a*, 87*b*, 87*c* and 87*d*. The groups of bars are engaged by two sets of brushes, said sets being disposed at opposite sides of the disk and being designated 88 to 95 respectively. A pair of conductors 96 and 97 are connected to brushes 88 and 89 respectively and a pair of conductors 98 and 99 are connected to brushes 90 and 91 respectively the other ends of said conductors being connected to the ends of the primary winding 100*a* of a transformer 100, the secondary winding of which is designated 100*b*. A pair of conductors 101 and 102 are connected to the ends of secondary winding 100*b* and to brushes 92 and 93. Another pair of conductors 103 and 104 are connected to the brushes 94 and 95 respectively. The brushes 88 to 95 are carried in brush holders 105 mounted in a bracket 106 having a flange secured to base 83 by the bolts 107. The bars and disk 80 are connected as follows:

Bar 84*a* is connected to bar 87*a* by conductor 108, which will be set into the disk 80 beneath said bars and be disposed at the rear side of the disk. Bar 84*b* is connected to bar 86*b* by conductor 109, bar 84*c* is connected to bar 87*c* by conductor 110, bar 84*d* is connected to bar 86*d* by conductor 111, bar 85*a* is connected to bar 86*a* by conductor 112, bar 85*b* is connected to bar 87*b* by conductor 113, bar 85*c* is connected to bar 86*c* by conductor 114, and bar 85*d* is connected to bar 87*d* by conductor 115.

In operation, direct current will be supplied to conductors 96 and 97. Assuming that conductor 96 delivers current of positive polarity, this will be transmitted to bar 87*a* by brush 88 and through conductor 108 to bar 84*a* so that current of positive polarity will be delivered to brush 91 and to conductor 99. At the same time current of negative polarity will be delivered by conductor 97 to ous changes may be made in the form, details, proportions and arrangement of the parts, without departing from the scope of applicant's invention, which, generally stated, consists in a device capable of carrying out the objects above set forth, in the novel parts and combinations of parts disclosed and defined in the appended claims.

What is claimed is:—

1. A conversion apparatus for electrical current having in combination, a plurality of groups of commutator bars, a pair of brushes for every four bars, a single means for rotating said groups as a unit, a pair of conductors leading from a source of current connected respectively to brushes of two of said groups, said latter brushes being in the same positions relative to said groups, brushes engaging said latter groups opposite said first mentioned brushes, conductors connected to said last mentioned brushes, a transformer, said last mentioned conductors being connected to the primary of said transformer, a pair of conductors connected to the secondary of said transformer, brushes connected to said last mentioned conductors respectively engaging a pair of said groups in the same positions relative to said groups, another pair of brushes engaging a pair of said groups, conductors leading from said last mentioned brushes for delivering current, the bars in said groups being respectively connected to each other so that said first mentioned current is alternated to deliver to said conductors connected to said primary and the current from said secondary is rectified and carried by said conductors delivering current.

2. A conversion apparatus for electrical current having in combination, four groups of commutator bars, rotating means on which said groups are carried to be rotated as a unit, four pairs of brushes, each pair respectively engaging one of said groups, a pair of conductors connected to a source of current and connected respectively to one brush of each pair engaging adjacent groups of said bars, conductors connected to the other brushes respectively of said adjacent groups adapted to deliver current for use, a transformer, conductors connected to the primary of said transformer, brushes respectively engaging the other two groups to which said last mentioned conductors are connected, another pair of brushes engaging said other groups, conductors connected to said last mentioned brushes and connected to the secondary of said transformer, said brushes engaging each group being disposed in like positions relative to said groups, conductors connecting opposite pairs of said groups for alternating a current delivered by said conductors connected to a source of current and for rectifying a current delivered from the secondary of said transformer.

3. A conversion apparatus for electrical current having in combination, four rotatable commutators each having four commutator bars thereon, a pair of oppositely disposed brushes engaging each commutator, a pair of line conductors connected respectively to brushes engaging the first and second commutators, a second set of conductors connected to brushes respectively engaging the first and second commutators for delivering current, a transformer, conductors connected to brushes engaging said third and fourth commutators and connected to the primary of said transformer, a pair of conductors connected respectively to the secondary of said transformer and connected to brushes respectively engaging the third and fourth commutators, and conductors connecting opposite bars in said first and second commutator to corresponding opposite bars in said third and fourth commutators.

4. The structure set forth in claim 3, a single shaft on which all of said commutators are mounted, said last mentioned conductors being secured to the bottoms of said commutator bars and extending longitudinally through and between said commutators.

In testimony whereof we affix our signatures.

JOHN H. CRAGG.
KENNETH B. CRAGG.